United States Patent
Bellis et al.

(10) Patent No.: US 10,762,212 B2
(45) Date of Patent: *Sep. 1, 2020

(54) EXPLOIT PREDICTION BASED ON MACHINE LEARNING

(71) Applicant: Kenna Security, Inc., Chicago, IL (US)

(72) Inventors: Edward T. Bellis, Evanston, IL (US);
Michael Roytman, Chicago, IL (US);
Jeffrey Heuer, New York, NY (US)

(73) Assignee: Kenna Security, Inc., Chicago, IL (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/158,873

(22) Filed: Oct. 12, 2018

(65) Prior Publication Data
US 2019/0163917 A1 May 30, 2019

Related U.S. Application Data

(63) Continuation of application No. 15/827,943, filed on Nov. 30, 2017, now Pat. No. 10,114,954.

(51) Int. Cl.
*G06F 21/57* (2013.01)
*G06N 20/00* (2019.01)

(52) U.S. Cl.
CPC ........... *G06F 21/577* (2013.01); *G06N 20/00* (2019.01)

(58) Field of Classification Search
CPC .............................. G06F 21/577; G06N 20/00
USPC ..................................................... 726/22–25
See application file for complete search history.

(56) References Cited

U.S. PATENT DOCUMENTS

| | | | |
|---|---|---|---|
| 6,219,805 B1* | 4/2001 | Jones ................... | G06F 11/3616 714/25 |
| 9,600,672 B1* | 3/2017 | Ramalingam ......... | G06F 21/577 |
| 9,998,480 B1* | 6/2018 | Gates .................. | H04L 63/1408 |
| 10,089,661 B1* | 10/2018 | Appalaraju ........ | G06Q 30/0282 |
| 2003/0115223 A1* | 6/2003 | Scott ......................... | G06F 8/71 |

(Continued)

OTHER PUBLICATIONS

Yonack, Noah, Medium, "A Non-Technical Introduction to Machine Learning", https://medium.com/safegraph/a-non-technical-introduction-to-machine-learning-b49fce202ae8, dated Mar. 3, 2017, 19 pages.

(Continued)

*Primary Examiner* — Mohammed Waliullah
(74) *Attorney, Agent, or Firm* — Hickman Palermo Becker Bingham LLP

(57) ABSTRACT

Generation of one or more models is caused based on selecting training data comprising a plurality of features including a prevalence feature for each vulnerability of a first plurality of vulnerabilities. The one or more models enable predicting whether an exploit will be developed for a vulnerability and/or whether the exploit will be used in an attack. The one or more models are applied to input data comprising the prevalence feature for each vulnerability of a second plurality of vulnerabilities. Based on the application of the one or more models to the input data, output data is received. The output data indicates a prediction of whether an exploit will be developed for each vulnerability of the second plurality. Additionally or alternatively, the output data indicates, for each vulnerability of the second plurality, a prediction of whether an exploit that has yet to be developed will be used in an attack.

20 Claims, 4 Drawing Sheets

| | PREVALENCE FEATURE 116 | DEVELOPED EXPLOIT FEATURE 118 | EXPLOIT DEVELOPMENT TIME FEATURE 120 | ATTACK FEATURE 122 | SCORE FEATURE 124 |
|---|---|---|---|---|---|
| SOFTWARE VULNERABILITY 100 | 2,000,000 | YES | 7 | 25 | 95 |
| SOFTWARE VULNERABILITY 102 | 1,750,000 | YES | 14 | 18 | 92 |
| SOFTWARE VULNERABILITY 104 | 1,500,000 | NO | NULL | NULL | 61 |
| SOFTWARE VULNERABILITY 106 | 1,250,000 | YES | 30 | 12 | 88 |
| SOFTWARE VULNERABILITY 108 | 1,000,000 | NO | NULL | NULL | 50 |
| SOFTWARE VULNERABILITY 110 | 750,000 | NO | NULL | NULL | 47 |
| SOFTWARE VULNERABILITY 112 | 500,000 | YES | 60 | 5 | 83 |
| SOFTWARE VULNERABILITY 114 | 250,000 | NO | NULL | NULL | 34 |

(56) References Cited

U.S. PATENT DOCUMENTS

| | | | | |
|---|---|---|---|---|
| 2014/0245376 | A1* | 8/2014 | Hibbert | H04L 63/20 |
| | | | | 726/1 |
| 2015/0365437 | A1* | 12/2015 | Bell, Jr. | G06F 21/577 |
| | | | | 726/1 |
| 2016/0120481 | A1* | 5/2016 | Li | G16H 50/70 |
| | | | | 705/3 |
| 2016/0315961 | A1* | 10/2016 | Duer | H04L 63/1433 |
| 2017/0078315 | A1* | 3/2017 | Allen | H04L 63/1441 |
| 2018/0232523 | A1* | 8/2018 | Copty | G06F 21/53 |
| 2020/0125342 | A1* | 4/2020 | Dominiak | G06F 8/73 |

OTHER PUBLICATIONS

Geng et al., "Machine Learning Crash Course: Part 1", dated Nov. 6, 2016, 17 pages, https://ml.berkeley.edu/blog/2016/11/06/tutorial-1/.

Geitgey, Adam, Machine Learning is Fun:, https://medium.com/@ageitgey/machine-learning-is-fun-80ea3ec3c471, dated May 5, 2104, 18 pages.

* cited by examiner

FIGURE 1

| | PREVALENCE FEATURE 116 | DEVELOPED EXPLOIT FEATURE 118 | EXPLOIT DEVELOPMENT TIME FEATURE 120 | ATTACK FEATURE 122 | SCORE FEATURE 124 |
|---|---|---|---|---|---|
| SOFTWARE VULNERABILITY 100 | 2,000,000 | YES | 7 | 25 | 95 |
| SOFTWARE VULNERABILITY 102 | 1,750,000 | YES | 14 | 18 | 92 |
| SOFTWARE VULNERABILITY 104 | 1,500,000 | NO | NULL | NULL | 61 |
| SOFTWARE VULNERABILITY 106 | 1,250,000 | YES | 30 | 12 | 88 |
| SOFTWARE VULNERABILITY 108 | 1,000,000 | NO | NULL | NULL | 50 |
| SOFTWARE VULNERABILITY 110 | 750,000 | NO | NULL | NULL | 47 |
| SOFTWARE VULNERABILITY 112 | 500,000 | YES | 60 | 5 | 83 |
| SOFTWARE VULNERABILITY 114 | 250,000 | NO | NULL | NULL | 34 |

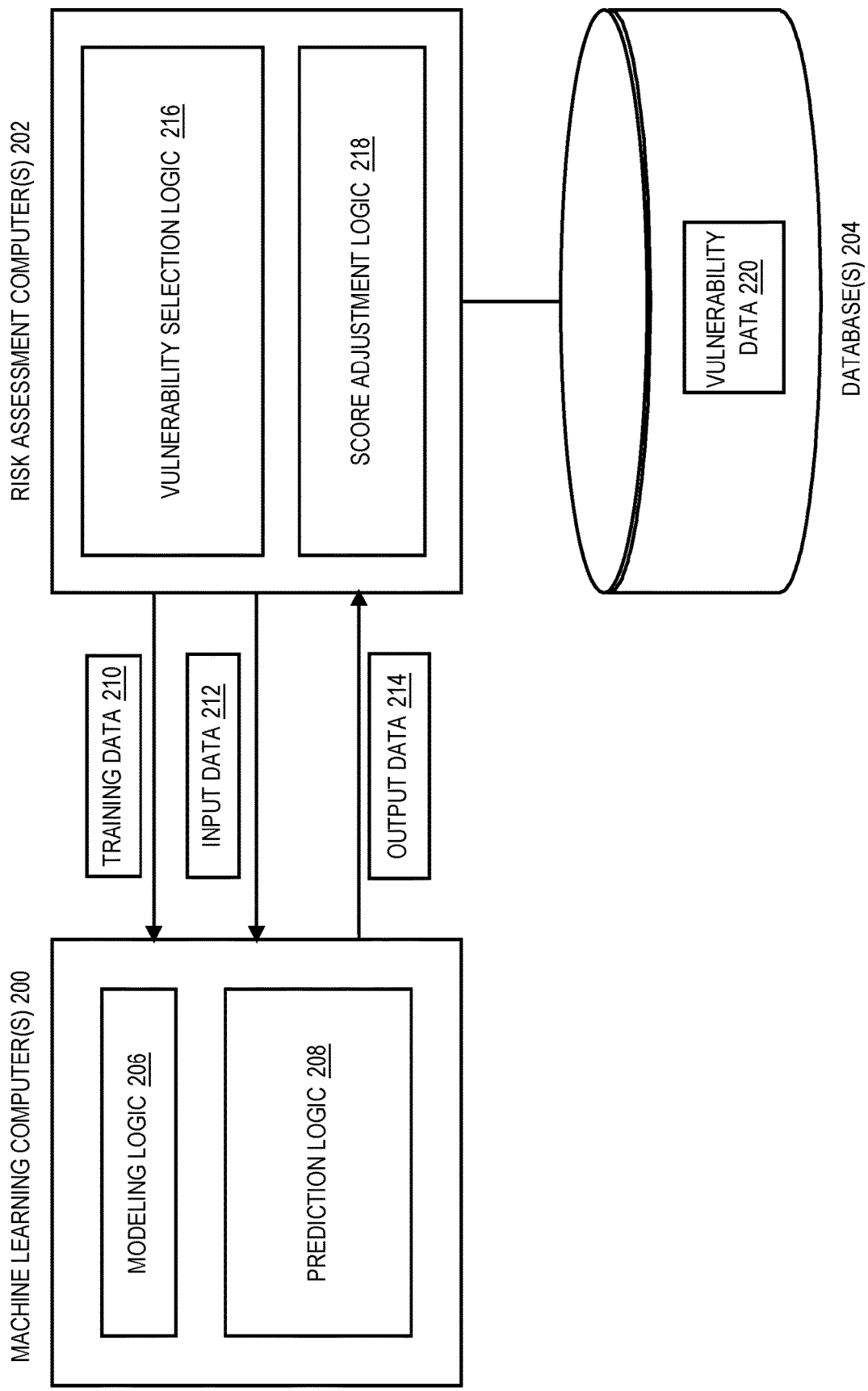

EXPLOIT PREDICTION BASED ON MACHINE LEARNING

BENEFIT CLAIM

This application claims benefit under 35 U.S.C. § 120 as a Continuation of application Ser. No. 15/827,943 filed Nov. 30, 2017, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure relates generally to security of computing devices. More specifically, the present disclosure relates to techniques for exploit prediction based on machine learning. SUGGESTED ART UNIT: 2121/2129.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Software vulnerabilities are weaknesses or flaws in computational logic. As used herein, the term "software" also refers to firmware. When exploited, a vulnerability can facilitate unauthorized access to a computing device, enable an attack to remain undetected, permit unauthorized modification of data, reduce the availability of data, and/or the like. An attempt to exploit or take advantage of a vulnerability is referred to herein as an attack, and a successful attack results in what is hereinafter referred to as a breach.

Often, programs are developed to exploit vulnerabilities. Such programs are referred to herein as exploits. For example, a particular vulnerability affecting Linux kernel versions through 3.14.5 failed to ensure that system calls had two different futex addresses. An exploit known as Towelroot took advantage of this vulnerability to gain root access to Android devices.

Vulnerabilities can be remediated using patches, version upgrades, and/or the like. Due to resource constraints, however, not all vulnerabilities can be remediated at the same time. Thus, remediation of vulnerabilities is typically prioritized according to different levels of risk posed by different vulnerabilities. For example, some vulnerabilities may never have exploits developed for them, and some exploits may never be used in an attack. Accordingly, remediation may be prioritized in the following order: (1) vulnerabilities having exploits that have been used in attacks, (2) vulnerabilities having exploits that have not been used in attacks, and (3) vulnerabilities not having any exploits.

However, waiting for exploits to be developed and for attacks to occur exposes computing assets to a significant amount of risk. Thus, it would be beneficial to be able to predict whether an exploit will be developed for a particular vulnerability and, if so, whether the exploit will be used in an attack.

BRIEF DESCRIPTION OF THE DRAWINGS

In the drawings:

FIG. 1 is a table that depicts example features.

FIG. 2 is a block diagram that depicts an example computer architecture on which embodiments may be implemented.

Figure 3:
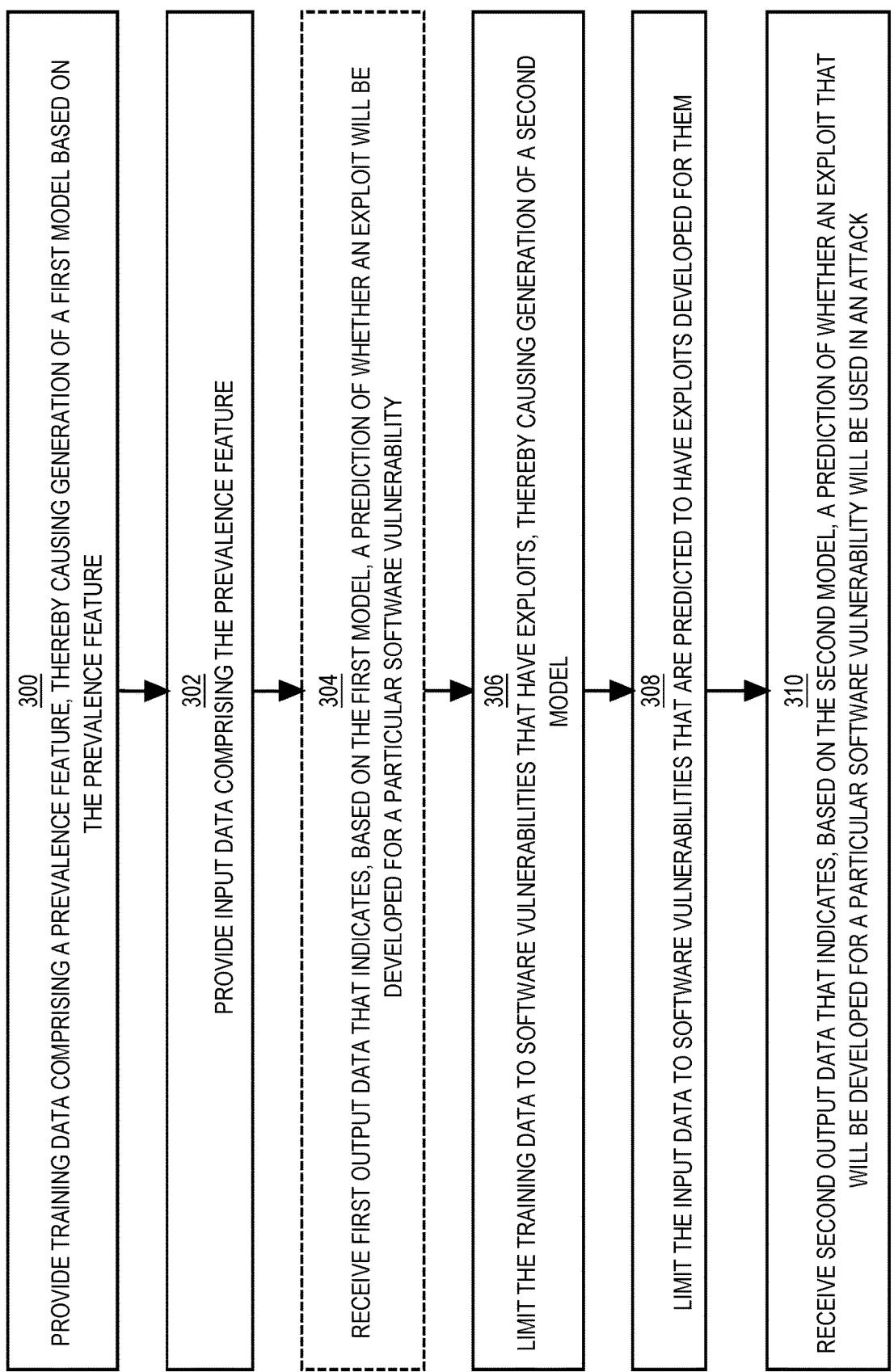
FIG. 3 is a flow diagram that depicts an approach for exploit prediction based on machine learning.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Embodiments are described herein according to the following outline:
    1.0 Introduction
    2.0 Vulnerability Features
        2.1 Prevalence Feature
        2.2 Developed Exploit Feature
        2.3 Exploit Development Time Feature
        2.4 Attack Feature
        2.5 Score Feature
        2.6 Other Features
    3.0 Structural and Functional Overview
        3.1 Machine Learning Computer
            3.1.1 Modeling Logic
            3.1.2 Prediction Logic
        3.2 Risk Assessment System
            3.2.1 Risk Assessment Computer
                3.2.1.1 Vulnerability Selection Logic
                3.2.1.2 Score Adjustment Logic
            3.2.2 Database
    4.0 Process Overview
    5.0 Hardware Overview
    6.0 Extensions and Alternatives
    1.0 Introduction The embodiments disclosed herein are related to exploit prediction based on machine learning. One or more machine learning computers may be used to generate a prediction of whether an exploit will be developed for a particular vulnerability and/or a prediction of whether an exploit to be developed for a particular vulnerability will be used in an attack. As used herein, a prediction of "whether" an event will occur may also include more specific information about the event, such as when the event will occur, how many times the event will occur, and/or the like.

A separate system may interact with the one or more machine learning computers to provide training and input data as well as to receive output data comprising predictions. The system comprises storage media, one or more processors, and one or more programs stored in the storage media and configured for execution by the one or more processors. In some embodiments, the system uses the predictions of the one or more machine learning computers to assign priority levels to vulnerabilities. For example, the priority levels may be represented as numeric scores indicating estimated risks of breach.

The system provides, to the one or more machine learning computers, training data with which to generate one or more predictive models. The training data comprises one or more features corresponding to a first plurality of vulnerabilities that have been selected for training the one or more machine learning computers. The one or more features may comprise one or more prevalence features that indicate how widespread a particular vulnerability is. Examples of prevalence features include a number of copies of software affected by a particular vulnerability, a number of references in a database to a particular vulnerability, whether a particular vulnerability is among the most popular targets, and/or the like. The training data may also comprise other features, such as a developed exploit feature that indicates whether a particular vulnerability already has an exploit developed for it, an exploit development time feature that indicates whether an exploit was developed within a particular number of days of a particular vulnerability being published, and an attack feature that indicates whether a particular vulnerability was successfully attacked.

The one or more predictive models may include a classification model, a linear regression model, and/or the like. Thus, the one or more predictive models may establish a correlation between the one or more prevalence features and whether an exploit will be developed for a particular vulnerability. Additionally or alternatively, the predictive model may establish a correlation between the one or more prevalence features and whether an exploit to be developed for a particular vulnerability will be used in an attack. In some embodiments, the latter correlation is established using a subset of the training data that corresponds to vulnerabilities for which exploits have already been developed.

The system also provides, to the one or more machine learning computers, input data that also comprises the one or more prevalence features. The one or more prevalence features correspond to a second plurality of vulnerabilities that do not yet have exploits developed for them. In some embodiments, the input data also comprises one or more predictions generated by the one or more machine learning computers. For example, the input data may comprise a prediction that a particular vulnerability will have an exploit developed for it, a prediction that an exploit will be developed for a particular vulnerability within a particular number of days of publishing the particular vulnerability, and/or the like.

The system receives, from the one or more machine learning computers, output data generated based on applying the one or more predictive models to the input data. The output data indicates which of the second plurality of vulnerabilities is predicted to have exploits developed for them; when, if ever, exploits are predicted to be developed for them; and/or which of the second plurality of vulnerabilities is predicted to be attacked. In some embodiments, the output data comprises predicted values of one or more of the aforementioned features, such as the developed exploit feature, the exploit development time feature, and/or the successful/unsuccessful attack feature.

2.0 Vulnerability Features

FIG. 1 is a table that depicts example features 116-124 corresponding to vulnerabilities 100-114. As used herein, a vulnerability feature refers to a property or attribute of a vulnerability. For the sake of clarity and ease of explanation, the table of FIG. 1 depicts features 116-124 as being organized in a structured format. However, some features may exist as unstructured data that may or may not undergo feature transformation to enable organization in a structured format. Non-limiting examples of feature transformation involve tokenization, n-grams, orthogonal sparse bigrams, quantile binning, normalization, and Cartesian products of multiple features.

2.1 Prevalence Feature

In the example of FIG. 1, prevalence feature 116 is of a numeric type. In some embodiments, prevalence feature 116 indicates a number of copies of software that are affected by a particular vulnerability. For example, prevalence feature 116 may indicate that software vulnerability 100 has 2,000,000 instances across a set of computing assets (e.g., software, hardware) being monitored. However, in some embodiments, prevalence feature 116 indicates a subset of the affected copies. For example, prevalence feature 116 may indicate a subset corresponding to remediated copies or a subset corresponding to unremediated copies. In some embodiments, prevalence feature 116 is derived from multiple features. For example, prevalence feature 116 may indicate a sum of the remediated copies and the unremediated copies.

In some embodiments, prevalence feature 116 indicates a number of references, in a particular database, to a particular vulnerability. For example, prevalence feature 116 may indicate that software vulnerability 114 has 250,000 different references to it in a particular organization's configuration management database.

In some embodiments, a prevalence feature is of a binary type. For example, the prevalence feature may indicate whether a particular vulnerability is a popular target based on bit values corresponding to "Yes" or "No". Determining values for such a feature may involve sorting and/or ranking vulnerabilities according to one or more of the aforementioned numeric features and selecting the vulnerabilities that are less than a predetermined threshold value. For example, a popular target may refer to a vulnerability ranked in the top 5% by number of affected copies. Thus, if there are a total of one billion vulnerabilities being used in a training dataset, the vulnerabilities having rankings of 50 million and above may be assigned a value corresponding to "Yes", while other vulnerabilities may be assigned a value corresponding to "No".

2.2 Developed Exploit Feature

In the example of FIG. 1, developed exploit feature 118 is of a binary type. In some embodiments, developed exploit feature 118 indicates whether or not an exploit has been developed for a particular vulnerability. For example, developed exploit feature 118 may indicate that software vulnerability 102 has an exploit developed for it, but developed exploit feature 118 may indicate that software vulnerability 104 does not currently have an exploit developed for it.

In some embodiments, developed exploit feature 118 further indicates whether or not the exploit is of a particular type. For example, developed exploit feature 118 may indicate whether or not a particular software vulnerability has an exploit that was included in an information security tool, such as METASPLOIT. Additionally or alternatively, developed exploit feature 118 may indicate whether or not a particular software vulnerability has an exploit that has an entry in a particular database, such as the Exploit Database. Additionally or alternatively, developed exploit feature 118 may indicate whether or not a particular software vulnerability has an exploit that causes a buffer overflow or that facilitates a man-in-the-middle attack.

In some embodiments, a developed exploit feature is of a numeric type. For example, the developed exploit feature may indicate an age of an exploit at the time of computation.

In some embodiments, a developed exploit feature is of a textual type. For example, the developed exploit feature may specify an author of an exploit developed for a particular vulnerability. Additionally or alternatively, the developed exploit feature may specify a platform or framework for launching an exploit. Additionally or alternatively, the developed exploit feature may specify one or more ports that are targeted by an exploit.

2.3 Exploit Development Time Feature

In the example of FIG. 1, exploit development time feature 120 is of a numeric type. In some embodiments, exploit development time feature 120 indicates an amount of time that elapsed between publication of a particular software vulnerability and development of an exploit for the particular software vulnerability. For example, exploit development time feature 120 indicates that it took seven days for an exploit to be developed for software vulnerability 100.

In some embodiments, an exploit development time feature is of a binary type. For example, the exploit development time feature may indicate whether or not an exploit was developed for a particular software vulnerability within n days of the particular software vulnerability being published, where n can be any predetermined number.

2.4 Attack Feature

In the example of FIG. 1, attack feature 122 is of a numeric type. In some embodiments, attack feature 122 indicates an amount of time that elapsed between publication of a particular vulnerability and the first attack that successfully exploited the particular vulnerability. In some embodiments, attack feature 122 indicates an amount of time that elapsed between development of the first exploit and the first attack that successfully exploited the particular vulnerability. For example, attack feature 122 may indicate that the first attack successfully exploiting software vulnerability 106 occurred twelve days after the first exploit was developed and that the first attack successfully exploiting software vulnerability 112 occurred five days after the first exploit was developed. Notably, attack feature 122 specifies null values for software vulnerabilities without developed exploits.

In some embodiments, attack feature 122 indicates an age of the first successful attack at the time of computation. For example, attack feature 122 may indicate that the first attack successfully exploiting software vulnerability 100 occurred twenty-five days ago.

In some embodiments, attack feature 122 indicates a number of attacks successfully exploiting a particular vulnerability. For example, attack feature 122 may indicate that eighteen attacks successfully exploited software vulnerability 102.

In some embodiments, an attack feature is of a binary type. For example, the attack feature may indicate whether or not an exploit developed for a particular software vulnerability was used in a successful attack. Additionally or alternatively, the attack feature may indicate whether or not an exploit was used in a successful attack within a particular time period, such as within the past n months or within n days of the particular software vulnerability being published. Notably, n can be any predetermined number.

2.5 Score Feature

In the example of FIG. 1, score feature 124 is of a numeric type. In some embodiments, score feature 124 indicates a risk metric for a particular software vulnerability. For example, score feature 124 may indicate software vulnerability 108 is exposed to more risk than software vulnerability 110, because software vulnerability 108 has a risk score of fifty, which is higher than the risk score of forty-seven for software vulnerability 110. Common Vulnerability Scoring System (CVSS) score data may be used in the determination of a risk score as described in U.S. patent application Ser. No. 14/181,352, the entirety of which is incorporated herein by reference.

Risk scores may be used to prioritize remediation of vulnerabilities. For example, vulnerabilities having higher risk scores may be prioritized over vulnerabilities having lower risk scores. Furthermore, risk scores for computing assets may be determined based on risk scores for vulnerabilities. Thus, risk scores may be used to prioritize remediation of computing assets.

As will be described in greater detail below, risk scores may be adjusted based on predictions as to whether an exploit will be developed for a particular vulnerability and/or whether an exploit will be used in an attack. Advantageously, this enables remediation of vulnerabilities even before exploits can be developed.

2.6 Other Features

Any number of a variety of other vulnerability features may also be collected. Non-limiting examples of such features include the following:

- a numeric identifier of a particular vulnerability, such as the identifiers used by the Common Vulnerabilities and Exposures system;
- a total number of software-version pairs that are exposed to a particular vulnerability;
- a total number of vendors (e.g., ADOBE, MICROSOFT) that are exposed to a particular vulnerability;
- a total number of products that a particular vulnerability affects;
- the age of a particular vulnerability at the time of computation;
- an indication of whether or not a particular vulnerability allows remove code executions;
- an indication of whether or not a particular vulnerability affects more than one vendor;
- an indication of whether or not a fix exists for a particular vulnerability;
- a categorical description of the type of access necessary to successfully exploit a particular vulnerability;
- a categorical description (e.g., low, medium, high) of how difficult it is to successfully exploit a particular vulnerability;
- a categorical description of the type of system authentication necessary to successfully exploit a particular vulnerability;
- a categorical description of the impact on data confidentiality if a particular vulnerability is successfully exploited;
- a categorical description of the impact on data integrity if a particular vulnerability is successfully exploited;
- a categorical description of the impact on data availability if a particular vulnerability is successfully exploited;

a categorical identifier of a particular vulnerability, such as the identifiers used by the Web Application Security Consortium and/or the Common Weakness Enumeration project;

a categorical description of the type of fix necessary to remediate a particular vulnerability;

a textual description comprising a summary of a particular vulnerability;

a textual description comprising an enumeration of all of the vendors affected by a particular vulnerability;

a textual description comprising an enumeration of all of the products affected by a particular vulnerability.

3.0 Structural and Functional Overview

Referring to the example embodiment of FIG. 2, machine learning computer(s) 200 are communicatively coupled to a system comprising risk assessment computer(s) 202 and database(s) 204. Although not explicitly depicted in FIG. 2, a network connection typically separates machine learning computer(s) 200 from the system. Machine learning computer(s) 200 and the system may reside on the same network or on different networks. For example, machine learning computer(s) 200 may provide a cloud-based service, such as a machine learning product provided by AMAZON WEB SERVICES.

Figure 4:
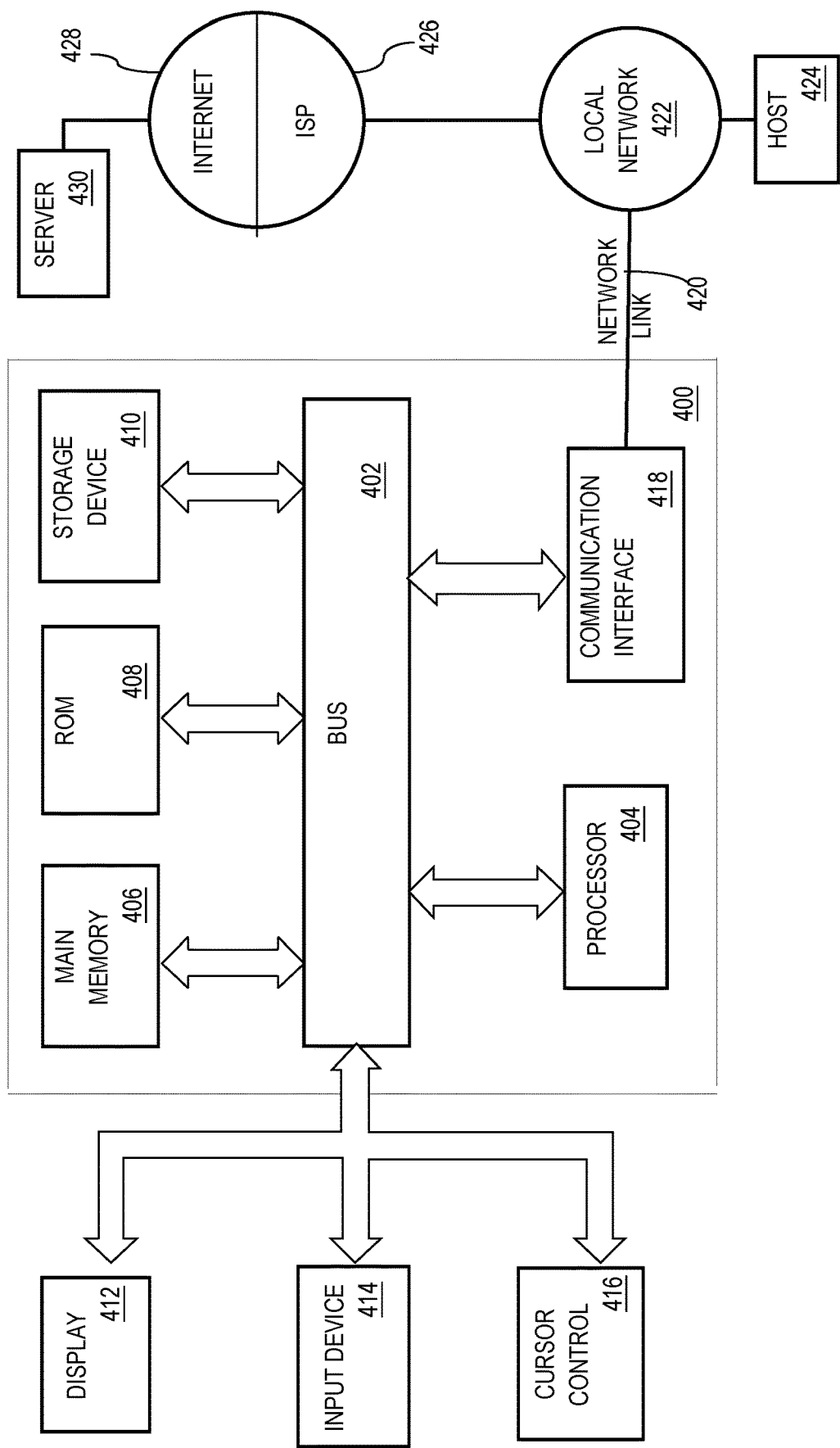
FIG. 4 is a block diagram that depicts a computer system on which embodiments may be implemented.

Each of the logical and/or functional units depicted in the figures or described herein may be implemented using any of the techniques further described herein in connection with FIG. 4. While the figures include lines that indicate various devices and/or logical units being communicatively coupled, each of the systems, computers, devices, storage, and logic may be communicatively coupled with each other.

As used herein, a "computer" may be one or more physical computers, virtual computers, and/or computing devices. For example, a computer may be a server computer; a cloud-based computer; a cloud-based cluster of computers; a virtual machine instance or virtual machine computing elements such as a virtual processor, storage, and memory; a data center, a storage device; a desktop computer; a laptop computer; a mobile device, and/or the like. A computer may be a client and/or a server. Any reference to "a computer" herein may mean one or more computers, unless expressly stated otherwise.

3.1 Machine Learning Computer(s)

As mentioned above, machine learning is used to generate one or more prediction models that are used to predict whether an exploit will be developed for a particular vulnerability and/or whether an exploit to be developed for a particular vulnerability will be used in an attack. Machine learning is a subfield of computer science that evolved from the study of pattern recognition and computation learning theory in artificial intelligence. Machine learning explores the study and construction of algorithms that can learn from and make predictions based on data. Such algorithms operate by building a model from an example training set of input observations in order to make data-driven predictions or decisions expressed as outputs, rather than following strictly static program instructions.

Machine learning is employed in a range of computing tasks where designing and programming explicit algorithms is infeasible. Example applications include spam filtering, optical character recognition (OCR), search engines, and computer vision.

Within the field of data analytics, machine learning is a method used to devise complex models and algorithms that lend themselves to prediction. These analytical models allow researchers, data scientists, engineers, and analysts to produce reliable, repeatable decisions and results as well as to uncover hidden insights through learning from historical relationships and trends in the data.

Any machine learning technique may be used to generate the one or more prediction models. Examples of machine learning algorithms include random forest, decision tree learning, association rule learning, artificial neural network, support vector machines, and/or Bayesian networks. Embodiments are not limited to any particular type of machine learning technique or algorithm.

Referring to FIG. 2, machine learning computer(s) 200 comprise modeling logic 206 and prediction logic 208. Machine learning computer(s) 200 receive training data 210 and input data 212 from risk assessment computer(s) 202, and machine learning computer(s) 200 send output data 214 to risk assessment computer(s) 202.

3.1.1 Modeling Logic

Modeling logic 206 processes training data 210 and implements one or more machine learning techniques to generate one or more prediction models. Training data 210 corresponds to a plurality of software vulnerabilities referred to herein as a "training set" of software vulnerabilities. More specifically, training data 210 comprises a number of features for each software vulnerability in the training set.

Any of a variety of prediction models can be used. Example prediction models include a binary classification model, a logistic regression model, a multiclass classification model, a multinomial logistic regression model, and/or a linear regression model.

In some embodiments, modeling logic 206 generates a prediction model for determining whether and/or when an exploit will be developed for a particular software vulnerability. Training data 210 may comprise a developed exploit feature and/or a developed exploit time feature for each software vulnerability in the training set. Training data 210 may further comprise one or more other features, such as one or more prevalence features. This enables modeling logic 206 to generate the prediction model based on the one or more other features.

In some embodiments, modeling logic 206 generates a prediction model for determining whether an exploit to be developed for a particular software vulnerability will be used in an attack. Training data 210 may comprise a developed exploit feature/developed exploit time feature and an attack feature. Training data 210 may further comprise one or more other features, such as one or more prevalence features. This enables modeling logic 206 to generate the prediction model based on the one or more other features.

3.1.2 Prediction Logic

Prediction logic 208 applies one or more prediction models to at least some of input data 212 to generate output data 214. Input data 212 corresponds to a plurality of software vulnerabilities that have yet to have an exploit developed for them. Output data 214 comprises predictions regarding the plurality of software vulnerabilities. In some embodiments, the predictions serve as features used to generate other predictions. In some embodiments, the predictions are used to adjust the risk scores of the plurality of software vulnerabilities.

For example, input data 212 may comprise a prevalence feature, but not a developed exploit feature/developed exploit time feature, for each software vulnerability of a plurality of software vulnerabilities. Prediction logic 208 may apply a prediction model for determining whether and/or when an exploit will be developed for a particular software vulnerability. Thus, values of a developed exploit feature/developed exploit time feature may be predicted. These values may be sent to risk assessment computer(s)

202 as output data 214 or at least some of these values may be used as input data for predicting values of an attack feature.

If predicted values of a developed exploit feature/developed exploit time feature are used as input data, prediction logic 208 may apply a prediction model for determining whether an exploit to be developed for a particular software vulnerability will be used in an attack. For example, if the predicted value of a developed exploit feature corresponds to "No", then the predicted value of an attack feature would also correspond to "No"; however, if the predicted value of a developed exploit feature corresponds to "Yes", then the predicted value of an attack feature may correspond to "Yes" or "No" depending on the values of other features, such as a prevalence feature. Thus, values of an attack feature may be predicted. These values may be sent to risk assessment computer(s) 202 as output data 214.

3.2 Risk Assessment System

In the example of FIG. 2, a risk assessment system comprises risk assessment computer(s) 202 and database(s) 204. Risk assessment computer(s) 202 is communicatively coupled to database(s) 204.

3.2.1 Risk Assessment Computer(s)

Risk assessment computer(s) 202 comprise vulnerability selection logic 216 and score adjustment logic 218. Vulnerability selection logic 216 generates training data 210 and input data 212. Score adjustment logic 218 processes output data 214.

3.2.1.1 Vulnerability Selection Logic

Vulnerability selection logic 216 may generate training data 210 based on interacting with database(s) 204. More specifically, vulnerability selection logic 216 may determine which of the software vulnerabilities stored in database(s) 204 are to be included in a training set.

For example, to cause generation of a prediction model for determining whether and/or when an exploit will be developed for a particular software vulnerability, vulnerability selection logic 216 may include, in the training set, a plurality of software vulnerabilities, wherein each software vulnerability in the training set has a value for a developed exploit feature and/or a value for a developed exploit time feature. Additionally or alternatively, to cause generation of a prediction model for determining whether an exploit to be developed for a particular software vulnerability will be used in an attack, vulnerability selection logic 216 may include, in the training set, a plurality of software vulnerabilities, where each software vulnerability in the training set has values for a developed exploit feature/developed exploit time feature and an attack feature.

Vulnerability selection logic 216 also generates input data 212. In some embodiments, vulnerability selection logic 216 determines which of the software vulnerabilities stored in database(s) 204 do not yet have an exploit developed for them and includes one or more features for them in input data 212. For example, input data 212 may include recently published software vulnerabilities. When a prediction model for determining whether and/or when an exploit will be developed for a particular software vulnerability is applied to input data 212, machine learning computer(s) 200 generates predictions as to whether and/or when exploits will be developed for the software vulnerabilities of input data 212. When a prediction model for determining whether an exploit to be developed for a particular software vulnerability will be used in an attack is applied to input data 212, machine learning computer(s) 200 generates predictions as to whether exploits to be developed for the software vulnerabilities of input data 212 will be used in attacks.

In some embodiments, vulnerability selection logic 216 generates input data based on a subset of predictions generated by machine learning computer(s) 200. For example, at time T1, vulnerability selection logic 216 may include features of software vulnerabilities A-C in input data 212A to a first prediction model. At time T2, vulnerability selection logic 216 may receive output data 214A comprising predictions indicating that software vulnerabilities A and B, but not C, will have exploits developed for them. At time T3, vulnerability selection logic 216 may include features of software vulnerabilities A and B, but not C, in input data 212B to a second prediction model that is different than the first prediction model. Input data 212B may include predicted values for a developed exploit feature/developed exploit time feature. At time T4, risk assessment computer(s) 202 may receive output data 214B comprising predictions indicating whether software vulnerabilities A and B will have exploits developed for them that will be used in attacks.

3.2.1.2 Score Adjustment Logic

Score adjustment logic 218 modifies risk scores for software vulnerabilities based on output data 214. Modified risk scores may be stored in database(s) 204.

For example, software vulnerability A may be a recently published vulnerability having a risk score of seventy. If software vulnerability A is predicted to have an exploit developed for it, then the risk score may be increased to eighty. If the exploit is predicted to be used in an attack, the risk score may be increased to ninety. However, if no exploit is predicted to be developed for it, the risk score may be decreased to sixty.

3.2.2 Database(s)

Database(s) 204 may be implemented on any storage medium, including volatile or non-volatile storage media. Database(s) 204 store vulnerability data 220. Examples of vulnerability data 220 are depicted in FIG. 1.

4.0 Process Overview

FIG. 3 is a flow diagram that depicts an example approach for exploit prediction based on machine learning. In some embodiments, the approach is performed by risk assessment computer(s) 202.

At block 300, training data is provided to one or more machine learning computers. The training data comprises a prevalence feature and a developed exploit feature/developed exploit time feature for each software vulnerability in a training set. Thus, the one or more machine learning computers generate a first model for determining whether and/or when an exploit will be developed for a particular software vulnerability based on a plurality of features of the particular software vulnerability.

At block 302, input data is provided to the one or more machine learning computers. The input data comprises a prevalence feature for a plurality of software vulnerabilities that do not yet have an exploit developed for them. Thus, the one or more machine learning computers apply the first model to generate predictions based on the prevalence feature. The predictions indicate whether and/or when an exploit will be developed for each software vulnerability of the plurality of software vulnerabilities.

At optional block 304, the one or more machine learning computers return output data indicating a prediction of whether an exploit will be developed for each software vulnerability of the plurality of software vulnerabilities. For example, the output data may comprise predicted values of a developed exploit feature/developed exploit time feature for each software vulnerability of the plurality of software vulnerabilities.

At block 306, a subset of the training data is provided to the one or more machine learning computers. Hereinafter, the subset of the training data is referred to as "evaluation data". The evaluation data is limited to software vulnerabilities that already have exploits developed for them. Thus, the one or more machine learning computers generate a second model for determining whether an exploit to be developed for a particular software vulnerability will be used in an attack.

At block 308, a subset of the input data is provided to the one or more machine learning computers. The subset of the input data is limited to software vulnerabilities that are predicted to have exploits developed for them. Determination of the subset of the input data may be based on the output data of optional block 304. More specifically, the subset of the input data may be limited to software vulnerabilities that correspond to a subset of the output data of optional block 304. The subset of the output data may predict that a subset of the plurality of software vulnerabilities will have exploits developed for them.

Accordingly, the one or more machine learning computers apply the second model to generate a prediction for each software vulnerability included in the subset of the plurality of software vulnerabilities. The prediction indicates whether an exploit to be developed for the software vulnerability will be used in an attack.

At block 310, the one or more machine learning computers return output data indicating a prediction of whether there will be an attack involving an exploit to be developed for each software vulnerability in the subset of the plurality of software vulnerabilities. For example, the output data may comprise predicted values of an attack feature for each software vulnerability in the subset of the plurality of software vulnerabilities.

In some embodiments, the output data of block 310 is used to adjust a risk score for one or more software vulnerabilities. Risk scores may be used to prioritize remediation of software vulnerabilities. For example, remediation may be prioritized in the following order: (1) software vulnerabilities predicted to have exploits developed for them, where the exploits are predicted to be used in attacks; (2) software vulnerabilities predicted to have exploits developed for them, where the exploits are predicted not to be used in attacks; and (3) software vulnerabilities predicted not to have exploits developed for them. Furthermore, software vulnerabilities predicted to have exploits developed for them may be prioritized according to when exploits are predicted to be developed and/or when attacks are predicted to occur.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A system comprising:
   storage media;
   one or more processors;
   and one or more programs stored in the storage media and configured for execution by the one or more processors, the one or more programs comprising instructions for:
   causing generation of a first prediction model based on selecting first training data comprising one or more prevalence features for each software vulnerability of a first plurality of software vulnerabilities, wherein the first prediction model enables determining whether an exploit is likely to be developed for a particular software vulnerability;
   causing application of the first prediction model to first input data comprising the one or more prevalence features for each software vulnerability of a second plurality of software vulnerabilities, wherein each software vulnerability of the second plurality of software vulnerabilities has yet to have an exploit developed for said each software vulnerability;
   receiving, based on the application of the first prediction model to the first input data, first output data that indicates, for each software vulnerability of the second plurality of software vulnerabilities, a prediction of whether an exploit will be developed for said each software vulnerability.

2. The system of claim 1, wherein each software vulnerability, in the second plurality of software vulnerabilities, is associated with a risk score, and wherein the one or more programs further comprise instructions for:
   based on the first output data, causing an adjustment to the risk score for each software vulnerability, of the second plurality of software vulnerabilities, that is predicted to have an exploit developed for said each software vulnerability.

3. The system of claim 1, wherein the one or more prevalence features indicate a number of copies of software affected by said each software vulnerability of the first plurality of software vulnerabilities.

4. The system of claim 1, wherein the one or more prevalence features indicate a number of copies of software affected by said each software vulnerability of the first plurality of software vulnerabilities, and wherein each software vulnerability of the first plurality of software vulnerabilities has a ranking determined based on a number of copies of software affected by said each software vulnerability, and wherein the one or more prevalence features includes an indication of whether the ranking of said each software vulnerability is less than a predetermined threshold.

5. The system of claim 1, wherein the one or more prevalence features indicate a number of references, in a database, to each software vulnerability of the first plurality of software vulnerabilities.

6. The system of claim 1, wherein the one or more programs further comprise instructions for:
causing generation of a second prediction model based on selecting second training data corresponding to a subset of the first plurality of software vulnerabilities, wherein each software vulnerability in the subset of the first plurality of software vulnerabilities already has an exploit developed for said each software vulnerability, wherein the second prediction model enables determining whether an exploit that has yet to be developed is likely to be used in an attack;
causing application of the second prediction model to second input data corresponding to a subset of the second plurality of software vulnerabilities, wherein each software vulnerability in the subset of the second plurality of software vulnerabilities is predicted to have an exploit developed for said each software vulnerability;
receiving, based on the application of the second prediction model to the second input data, second output data that indicates, for each software vulnerability in the subset of the second plurality of software vulnerabilities, a prediction of whether an exploit that is predicted to be developed for said each software vulnerability is also predicted to be used in an attack.

7. The system of claim 1, wherein the first training data further comprises an exploit development time feature indicating, for each software vulnerability of the first plurality of software vulnerabilities, whether an exploit for said each software vulnerability was developed within a particular number of days of publication of said each software vulnerability.

8. The system of claim 7, wherein the first output data indicates, for each software vulnerability of the second plurality of software vulnerabilities, a prediction of whether an exploit will be developed for said each software vulnerability within the particular number of days.

9. The system of claim 1, wherein the first output data indicates, for each software vulnerability of the second plurality of software vulnerabilities, a prediction of a number of days that will elapse between publication of said each software vulnerability and development of an exploit for said each software vulnerability.

10. A system comprising:
storage media;
one or more processors;
and one or more programs stored in the storage media and configured for execution by the one or more processors, the one or more programs comprising instructions for:
causing generation of a prediction model based on selecting training data comprising one or more prevalence features for each software vulnerability of a first plurality of software vulnerabilities, wherein the prediction model enables determining whether an exploit that has yet to be developed is likely to be used in an attack;
causing application of the prediction model to input data comprising one or more prevalence features for each software vulnerability of a second plurality of software vulnerabilities, wherein each software vulnerability of the second plurality of software vulnerabilities has yet to have an exploit developed for said each software vulnerability;
receiving, based on the application of the prediction model to the input data, first output data that indicates, for each software vulnerability of the second plurality of software vulnerabilities, a prediction of whether an exploit that is predicted to be developed for said each software vulnerability is also predicted to be used in an attack.

11. The system of claim 10, wherein the one or more prevalence features indicate a number of copies of software affected by said each software vulnerability of the first plurality of software vulnerabilities.

12. The system of claim 10, wherein the one or more prevalence features indicate a number of references, in a database, to each software vulnerability of the first plurality of software vulnerabilities.

13. The system of claim 10, wherein each software vulnerability of the first plurality of software vulnerabilities has a ranking determined based on a number of copies of software affected by said each software vulnerability, and wherein the one or more prevalence features indicate whether the ranking of said each software vulnerability is less than a predetermined threshold.

14. The system of claim 10, wherein the input data comprises second output data that indicates, for each software vulnerability of the second plurality of software vulnerabilities, a prediction that an exploit will be developed for said each software vulnerability.

15. The system of claim 10, wherein the training data further comprises an attack feature indicating whether each software vulnerability of the first plurality of software vulnerabilities has an exploit developed for said each software vulnerability that was used in an attack.

16. The system of claim 10, wherein each software vulnerability, in the second plurality of software vulnerabilities, is associated with a risk score, and wherein the one or more programs further comprise instructions for:
based on the first output data, causing an adjustment to the risk score for each software vulnerability, in the second plurality of software vulnerabilities, that is predicted to have an exploit developed for said each software vulnerability, wherein the exploit is also predicted to be used in an attack.

17. A method comprising:
causing generation of a first prediction model based on selecting first training data comprising a prevalence feature for each software vulnerability of a first plurality of software vulnerabilities, wherein the first prediction model enables determining whether an exploit is likely to be developed for a particular software vulnerability;
causing application of the first prediction model to first input data comprising the prevalence feature for each software vulnerability of a second plurality of software vulnerabilities, wherein each software vulnerability of the second plurality of software vulnerabilities has yet to have an exploit developed for said each software vulnerability;
receiving, based on the application of the first prediction model to the first input data, first output data that indicates, for each software vulnerability of the second plurality of software vulnerabilities, a prediction of whether an exploit will be developed for said each software vulnerability;
causing generation of a second prediction model based on selecting second training data corresponding to a subset of the first plurality of software vulnerabilities, wherein each software vulnerability in the subset of the first plurality of software vulnerabilities already has an exploit developed for said each software vulnerability, wherein the second prediction model enables determining whether an exploit that has yet to be developed is likely to be used in an attack;

causing application of the second prediction model to second input data corresponding to a subset of the second plurality of software vulnerabilities, wherein each software vulnerability in the subset of the second plurality of software vulnerabilities is predicted to have an exploit developed for said each software vulnerability;

receiving, based on the application of the second prediction model to the second input data, second output data that indicates, for each software vulnerability in the subset of the second plurality of software vulnerabilities, a prediction of whether an exploit that is predicted to be likely to be developed for said each software vulnerability is also predicted to be likely to be used in an attack;

wherein the method is performed using one or more computing devices.

18. The method of claim 17, further comprising:

based on the first output data, causing an adjustment to a risk score for each software vulnerability, of the second plurality of software vulnerabilities, that is predicted to have an exploit developed for said each software vulnerability.

19. The method of claim 17, further comprising:

based on the second output data, causing an adjustment to a risk score for each software vulnerability, in the subset of the second plurality of software vulnerabilities, that is predicted to have an exploit developed for said each software vulnerability, wherein the exploit is also predicted to be used in an attack.

20. The method of claim 17 wherein the prevalence feature indicates one of: a number of copies of software affected by said each software vulnerability of the first plurality of software vulnerabilities; whether a ranking of said each software vulnerability is less than a predetermined threshold; or a number of references, in a database, to each software vulnerability of the first plurality of software vulnerabilities.

* * * * *